US006986942B1

(12) United States Patent
Mayes

(10) Patent No.: US 6,986,942 B1
(45) Date of Patent: Jan. 17, 2006

(54) MICROWAVE ABSORBING STRUCTURE

(75) Inventor: Eric Mayes, Clifton (GB)

(73) Assignee: NanoMagnetics Limited, Bristol (GB)

(*) Notice: Subject to any disclaimer, the term of this patent is extended or adjusted under 35 U.S.C. 154(b) by 435 days.

(21) Appl. No.: 10/148,082

(22) PCT Filed: Nov. 27, 2000

(86) PCT No.: PCT/GB00/04505

§ 371 (c)(1),
(2), (4) Date: May 24, 2002

(87) PCT Pub. No.: WO01/41255

PCT Pub. Date: Jun. 7, 2001

Related U.S. Application Data

(63) Continuation-in-part of application No. 09/730,117, filed on Dec. 5, 2000, now Pat. No. 6,713,173, which is a continuation of application No. 09/308,166, filed on Jun. 25, 1999, application No. 10/148,082, which is a continuation-in-part of application No. 09/308,166, filed as application No. PCT/GB97/03152 on Nov. 17, 1997.

(30) Foreign Application Priority Data

Nov. 16, 1996 (GB) .............................................. 9623851
Dec. 3, 1999 (GB) .............................................. 9928741

(51) Int. Cl.
B32B 5/16 (2006.01)

(52) U.S. Cl. ........................ 428/327; 428/328; 428/329; 428/900

(58) Field of Classification Search ................. 428/327, 428/328, 329, 900
See application file for complete search history.

(56) References Cited

U.S. PATENT DOCUMENTS

| 3,951,904 | A | | 4/1976 | Tomonaga ................ 260/40 R |
| 3,966,510 | A | | 6/1976 | Aonuma et al. |
| 4,009,111 | A | | 2/1977 | Tamai et al. ............. 252/62.55 |
| 4,096,040 | A | | 6/1978 | Grosko |
| 4,269,826 | A | | 5/1981 | Zimmermann et al. |
| 4,333,961 | A | | 6/1982 | Bruce et al. |
| 4,425,261 | A | | 1/1984 | Stenius et al. .............. 502/339 |
| 4,452,773 | A | | 6/1984 | Molday ....................... 424/1.1 |
| 4,454,234 | A | | 6/1984 | Czerlinski ................... 436/526 |
| 4,480,256 | A | | 10/1984 | Wren ......................... 343/909 |
| 4,672,040 | A | | 6/1987 | Josephson |
| 4,735,796 | A | | 4/1988 | Gordon |
| 4,778,671 | A | * | 10/1988 | Wusirika ................. 423/592.1 |
| 4,814,098 | A | | 3/1989 | Inada et al. |
| 4,849,210 | A | | 7/1989 | Widder |
| 5,043,101 | A | | 8/1991 | Gordon |
| 5,062,991 | A | | 11/1991 | Siiman et al. ........... 252/315.2 |
| 5,069,216 | A | | 12/1991 | Groman et al. |
| 5,085,931 | A | * | 2/1992 | Boyer et al. ................ 428/328 |
| 5,147,841 | A | | 9/1992 | Wilcoxon ................... 502/173 |
| 5,189,078 | A | * | 2/1993 | Johnson et al. ............. 523/137 |
| 5,248,589 | A | | 9/1993 | Bose et al. ..................... 435/2 |
| 5,262,176 | A | | 11/1993 | Palmacci et al. ............... 424/9 |
| 5,304,382 | A | | 4/1994 | Monzyk |
| 5,328,681 | A | | 7/1994 | Kito et al. |
| 5,338,617 | A | | 8/1994 | Workinger et al. |
| 5,358,722 | A | | 10/1994 | Monzyk |
| 5,389,434 | A | * | 2/1995 | Chamberlain et al. ...... 428/323 |
| 5,427,767 | A | | 6/1995 | Kresse et al. |
| 5,437,892 | A | | 8/1995 | Nagayama et al. |
| 5,443,813 | A | | 8/1995 | Hainfeld .................... 424/1.17 |
| 5,491,219 | A | | 2/1996 | Mann |
| 5,505,996 | A | | 4/1996 | Nagayama |
| 5,512,332 | A | | 4/1996 | Liberti et al. |
| 5,543,226 | A | | 8/1996 | Bobrich et al. |
| 5,547,748 | A | | 8/1996 | Ruoff et al. |
| 5,552,072 | A | | 9/1996 | Arase et al. |
| 5,552,229 | A | | 9/1996 | Brodt et al. |
| 5,574,961 | A | | 11/1996 | Edelstein et al. |
| 5,599,618 | A | * | 2/1997 | Callahan et al. ............ 428/323 |
| 5,670,078 | A | | 9/1997 | Ziolo |
| 5,690,903 | A | | 11/1997 | Hainfeld |
| 5,697,902 | A | | 12/1997 | Goldenberg ................. 604/49 |

(Continued)

FOREIGN PATENT DOCUMENTS

| DE | 42 44 354 A1 | 7/1993 |
| EP | 0 049 770 | 4/1982 |
| EP | 0 525 199 | 2/1993 |
| EP | 0 686 448 A2 | 12/1995 |
| EP | 0 586 052 B1 | 7/1997 |
| EP | 0884739 A1 | 12/1998 |
| EP | 0 977 182 A2 | 2/2000 |
| EP | 1 186 659 A1 | 3/2002 |
| WO | 8800060 A1 | 1/1988 |
| WO | 89/11154 | 11/1989 |
| WO | 9305818 A1 | 4/1993 |
| WO | 95/05669 | 2/1995 |
| WO | 98/29535 | 7/1998 |
| WO | 9946782 A2 | 9/1999 |
| WO | 00/45171 | 8/2000 |
| WO | 00/71169 A2 | 11/2000 |
| WO | 01/74406 A2 | 10/2001 |
| WO | 04/027791 A1 | 4/2004 |

OTHER PUBLICATIONS

Huang et al., Construction of a Ferritin Reactor: An Efficient Means for Trapping Various Heavy Metal Ions in Flowing Seawater, Journal of Protein Chemistry, vol. 19, No. 6, 2000.

(Continued)

Primary Examiner—H. Thi Le
(74) Attorney, Agent, or Firm—Testa, Hurwitz & Thibeault, LLP

(57) ABSTRACT

There is disclosed a microwave absorbing structure which comprises a non-conductive matrix within which are embedded a plurality of spatially-separated ferro- or ferri-magnetic particles, each of which particles has a largest dimension no greater than 100 nm, said particles having been prepared by a process which includes a step in which the particles are formed within an organic macromolecular shell.

13 Claims, No Drawings

U.S. PATENT DOCUMENTS

| | | | |
|---|---|---|---|
| 5,766,764 | A | 6/1998 | Olli et al. |
| 5,843,569 | A | 12/1998 | Kaitsu et al. |
| 5,916,539 | A | 6/1999 | Pilgrimm ................. 424/9.322 |
| 5,925,455 | A * | 7/1999 | Bruzzone et al. ........... 428/328 |
| 6,054,495 | A * | 4/2000 | Markowitz et al. ........... 516/97 |
| 6,103,868 | A * | 8/2000 | Heath et al. ................ 528/482 |
| 6,127,002 | A * | 10/2000 | Callahan et al. ............ 427/472 |
| 6,180,389 | B1 * | 1/2001 | Douglas et al. .......... 435/235.1 |
| 6,254,662 | B1 | 7/2001 | Murray et al. ................ 75/348 |
| 6,262,129 | B1 | 7/2001 | Murray et al. ................ 516/33 |
| 6,451,220 | B1 | 9/2002 | Ziolo et al. |
| 2001/0009119 | A1 | 7/2001 | Murray et al. |
| 2003/0017336 | A1 | 1/2003 | Gedanken et al. |
| 2003/0059604 | A1 | 3/2003 | Hattori et al. |
| 2003/0215634 | A1 | 11/2003 | Hattori et al. |

OTHER PUBLICATIONS

Kenji et al., "Nanometer–Size Structures Fabricated by Bio–Nano–Process", Abstract, Meiji University.

Li et al., "Growth of Single–Walled Carbon Nanotubes From Discrete Catalytic Nanoparticles of Various Sizes", J. Phys. Chem. B, 105, pp. 11424–11431, 2001.

Warne et al., "Self Assembled Nanoparticulate Co : Pt for Data Storage Applications", IEEE Transactions on Magnetics, vol. 36, No. 5, Sep. 2000.

Yamashita, "Fabrication of a Two–Dimensional Array of Nano–Particles Using Ferritin Molecules", Thin Solid Films, 393, pp. 12–18, 2001.

Bidan et al. "New Nanocomposites Based on Tailor Dressed Magnetic Particles in a Poypyrrole Matrix" Advanced Materials, VCH Verlagsgesellschraft, Weinheim, Germany vol. 6, No. 2, pp. 152–155 (Feb. 1, 1994).

Ford et al., "Ferritin: Design and Formation of an Iron–Storage Molecules," Phil. Trans. R. Soc. Lond. vol. B304, No. 1121, Feb. 13, 1984, pp. 551–565.

Gider et al., "Classical and Quantum Magnetism in Synthetic Ferritin Proteins" Journal of Applied Physics, American Institute of Physics, New York, vol. 79, No. 8, pp. 5324–5326 (Apr. 15, 1996).

Harris "The Production of Paracrystalline Two–Dimensional Monolayers of Purified Protein Molecules," Micron, Pergamon Press Ltd., United Kingdom, vol. 13, No. 2, pp. 147–168 (1982).

Hong J. et al., "Granular Magnetic Cobalt Metal/Polymer Thin Film System," IEEE Transactions on Magnetics, vol. 32, No. 5, pp. 4475–4477.

Matsunaga "Synthesis of Nano–Scale Ultrafine Particles Using Biomolecules," Kagaku (Kyoto), vol. 46, ISS. 7, p. 498 (1991).

Meldrum et al., "Magnetoferritin: In Vitro Synthesis of a Novel Magnetic Protein", Science, vol. vol. 257, Jul. 24, 1992, pp. 522–523.

Meldrum, "Nanoscale Synthesis in Organized Assemblies (Ferritin, Electron Transfer, Magnetotactic Bacteria)," University of Bath (United Kingdom)(1992).

Meldrum et. al. "Synthesis of Inorganic Nanophase Materials in Supramolecular Protein Cages," Nature, vol. 349, No. 21 (Feb. 1991).

Moskowitz, et al. "Determination of the Preexponential Frequency Factor for Superparamagnetic Maghemite Particles in Magnetoferritin," J. Geophys. Res., Solid Earth, American Geophysical Union, vol. 102, No. B10 (1997).

Price et al., "Binding of Beryllium and Other Divalent Metal Icons," The Journal of Biological Chemistry, vol. 258, No. 18, Sep. 25, 1983, pp. 10873–10880.

Stefanini et al., "On the Mechanism of Horse Spleen Apoferritin Assembly: A Sedimentation Velocity and Circular Dichroism Study," Biochemistry, vol. 26, No. 7, Apr. 7, 1987, pp. 1831–1837.

Treffry et al., "Spectroscopic Studies on the Binding of Iron, Terbium, and Zinc by Apoferritin," Journal of Inorganic Biochemistry, vol. 21, No. 1 (1984), pp. 9–20.

Wardeska et al., "Metal Ion Complexes of Apoferritin," The Journal of Biological Chemistry, vol. 261, No. 15, May 25, 1986, pp. 6677–6683.

Xu et al. "Collapse of Apo– and Magnetoferritins at the Air–Water Interface," J Colloid Interface Sci, vol. 167, No. 2, pp. 314–319 (1994).

Wooding et al., "Proteins and Carbohydrates as Alternative Surfactants for the Preparation of Stable Magnetic Fluids", IEEE Transactions on Magnetics, vol. 24, No. 2, Mar. 1988.

* cited by examiner

MICROWAVE ABSORBING STRUCTURE

CROSS-REFERENCE TO RELATED APPLICATIONS

This application is the national phase of International (PCT) Patent Application Serial No. PCT/GB00/04505, filed Nov. 27, 2000, published under PCT Article 21(2) in English, which claims priority to and the benefit of United Kingdom Patent Application No. 9928741.9, filed Dec. 3, 1999. This application also claims priority to and the benefit of International (PCT) Patent Application Serial No. PCT/GB97/03152, filed Nov. 17, 1997, published under PCT Article 21(2) in English, now U.S. patent application Ser. No. 09/308,166, which claims priority to and the benefit of United Kingdom Patent Application No. 9623851.4, filed Nov. 16, 1996. This application further relates to U.S. patent application Ser. No. 09/730,117, filed Dec. 5, 2000, which is a continuation of U.S. patent application Ser. No. 09/308, 166. The disclosures of all of these applications are incorporated herein by reference.

This invention relates to a microwave absorbing structure or medium which comprises a composite composed of domain-separated, nanoscale (e.g. 1–100 nm) ferro- or ferri-magnetic particles and an electrical insulator in the form of a non-conducting matrix.

Microwave absorbent materials are those which do not reflect incident electromagnetic microwave radiation. Metals act as mirrors to these waves, as they reflect incident radiation to keep their electric field (E) equal to zero at the surface. To remove or decrease such reflection, a material must have a large depth of penetration so that the incident radiation can be cancelled or attenuated. To achieve a large depth of penetration, materials composed of magnetic particles dispersed in a non-conductive matrix can be used. Further, when the particles are not in contact, the resistance of the material is increased. Enhancing the absorption qualities of the material, the magnetic particles can be considered gyromagnetic oscillators in that they absorb, store, then emit energy at different moments of time after being subjected to an incident wave. This absorption is strongest at a natural ferromagnetic resonance frequency for the material, which depends on the inherent magnetic properties such as the anisotropy. The time-delayed energy emission being out of phase attenuates or cancels the incident microwaves. Such materials could be used to decrease EMI (electromagnetic interference) which affect computers and telecommunications, to shield cellular telephone users from microwave radiation, or to act as a radiation absorber for controlling the radiation pattern in a microwave antenna.

U.S. Pat. Nos. 3,951,904, 4,480,256 and 5,574,961, the content of each of which is hereby incorporated by reference, relate to microwave absorbing structures, and their uses.

The term "ferromagnetic" is often used in the art to embrace materials which are either "ferromagnetic" or "ferrimagnetic". The present invention may be utilized to prepare microwave absorbing structures containing ferro- or ferri-magnetic nanoscale particles.

According to a first aspect of the present invention, there is provided a microwave absorbing structure which comprises a non-conductive matrix within which are embedded a plurality of spatially-separated ferro- or ferri-magnetic particles, each of which particles has a largest dimension no greater than 100 nm, said particles having been prepared by a process which includes a step in which the particles are formed within an organic macromolecular shell.

The matrix material within which the particles are embedded may, if desired, be supported on a support member, for example to provide sufficient rigidity to the structure as a whole. Alternatively, the matrix material may be applied, or formed on, or otherwise associated with the surface of an object or article which requires microwave attenuation.

Preferably, the ferro- or ferri-magnetic particles have a largest dimension no greater than 50 nm, more preferably no greater than 15 nm.

Preferably, the particles do not vary in their largest dimension by more than about 10%, preferably by no more than 5%. This narrow size distribution can allow the microwave absorbent material to be tuned to a specific frequency band if desired.

In the present invention, the distance between adjacent particles is preferably as small as possible to allow for the widest range of packing densities. It is important, however, that neighbouring particles are sufficiently separated from each other so as not conduct. Typically, the lower limit on the spacing of the domains is about 2 nm. The separation of the particles may be, for example, up to about 1 $\mu$m. Using the invention, the volume fraction (packing density) may be varied (by changing the particle size and spacing) as necessary for the desired application.

Normally, the nanoparticles will be generally spherical in shape, in which case the largest dimension will refer to the diameter of the particle. In some circumstances, other particle morphologies may be established in which case the size of the particles is referred to in terms of the largest dimension.

As a result of the process by which they are formed, each of the ferro- or ferri-magnetic particles is initially at least partially accommodated within an organic macromolecule. In one embodiment, the microwave absorbing structure of the invention comprises the particles still accommodated within the organic macromolecules within which they are formed. This coating on the particles inhibits aggregation and oxidation, also helping them to be domain-separated and conductively disconnected. In this embodiment, the organic macromolecular shell may be functionalised (see below).

In another embodiment, the organic macromolecular shell is removed to leave the nanoparticle itself. In this embodiment, the protein shell can not be relied upon to isolate particles from each other. It is necessary, instead, to ensure that the particles are dispersed in the matrix in such a way that they are not able to contact with each other. This may be achieved, for example, by a process in which a mixture of the nanoparticles and particles of a binder are spray coated on to a substrate thereby forming a thin matrix layer containing the nanoparticles supported on a rigid substrate.

In yet a further embodiment, the organic macromolecular shell may be carbonized to provide a carbon layer surrounding a nanoparticle core. In this embodiment, the carbon layer is sufficient to conductively isolate particles in the matrix.

The term macromolecule here means a molecule, or assembly of molecules, which may have a molecular weight of up to 1500 kD, typically less than 500 kD.

The macromolecule should be capable of accommodating or at least partially accommodating the ferro- or ferri-magnetic particle, and may therefore comprise a suitable cavity capable of containing the particle; such a cavity will normally be fully enclosed within the macromolecule. Alternatively, the macromolecule may include a suitable opening which is not fully surrounded, but which nevertheless is capable of receiving and supporting the magnetic particle; for example, the opening may be that defined by an annulus in the macromolecule.

Suitable organic macromolecules which may be used in the invention are proteins having a suitable cavity or opening for accommodating a nanoscale particle. Presently preferred is the protein apoferritin (which is ferritin in which the cavity is empty). However, other suitable proteins include, for example, flagellar L-P rings and virus capsids.

The ferro- or ferri-magnetic material may be a metal, a metal alloy or an M-type or spinel ferrite. The metal, metal alloy or ferrite may contain one or more of the following: aluminium, barium, bismuth, cerium, chromium, cobalt, copper, dysprosium, erbium, europium, gadolinium, holmium, iron, lanthanum, lutetium, manganese, molybdenum, neodymium, nickel, niobium, palladium, platinum, praseodymium, promethium, samarium, strontium, terbium, thulium, titanium, vanadium, ytterbium, and yttrium. The metal, metal alloy or ferrite preferably contains one or more of the following: cobalt, iron and nickel.

In one embodiment of the microwave absorbing structure of the invention, the particles are accommodated or otherwise encased within the organic macromolecule, preferably protein coating, that inhibits aggregation and oxidation, and which also provides a surface which can be functionalised. For example, functionalising the surface may help the protein to be dispersed into a liquid which is then allowed to harden or cure to form a matrix within which the particles are embedded.

In this embodiment, the ferro- or ferri-magnetic material chosen is preferably a metal, such as cobalt, iron, or nickel; or a metal alloy; or an M-type ferrite.

The present invention most preferably makes use of the iron storage protein, ferritin, whose internal cavity is used to produce nanoscale magnetic particles. Ferritin has a molecular weight of 400 kD. Ferritin is utilised in iron metabolism throughout living species and its structure is highly conserved among them. It consists of 24 subunits which self-assemble to provide a hollow shell roughly 12 nm in outer diameter. It has an 8 nm diameter cavity which normally stores 4500 iron(III) atoms in the form of paramagnetic ferrihydrite. However, this ferrihydrite can be removed (a ferritin devoid of ferrihydrite is termed "apoferritin") and other materials may be incorporated. The subunits in ferritin pack tightly; however there are channels into the cavity at the 3-fold and 4-fold axes. The presently preferred macromolecule for use in the invention is the apoferritin protein which has a cavity of the order of 8 nm in diameter. The ferro- or ferri-magnetic particles to be accommodated within this protein will have a diameter up to about 15 nm in diameter, as the protein can stretch to accommodate a larger particle than one 8 nm in diameter.

Ferritin can be found naturally in vertebrates, invertebrates, plants, fungi, yeasts, bacteria. It can also be produced synthetically through recombinant techniques. Such synthetic forms may be identical to the natural forms, although it is also possible to synthesize mutant forms which will still retain the essential characteristic of being able to accommodate a is particle within their internal cavity. The use of all such natural and synthetic forms of ferritin is contemplated within the present invention.

The non-conductive matrix may be formed in situ. For example, the components required to form the matrix, for example a binder material, may be combined with a source of the nanoparticles, and spray coated as a liquid suspension on to a substrate, the coating then being allowed to solidify.

Another possibility is to provide a hardenable or curable liquid in which the nanoparticles are dispersed, and which is then allowed to harden or is cured. Prior to hardening, the liquid may be formed into a desired shape, such as a fibre which may, for example, be woven into a fabric or combined with other fibres, such as Kevlar fibres, and then spun to form a desired material having superior strength and microwave absorbing properties. As an alternative, prior to hardening, the liquid material may be applied to an inert surface, for example by spraying or painting. One example of a suitable curable liquid is a hardenable resin such as vinyl resin or epoxy resin. Other possible matrices include rubbers, whether natural or synthetic.

The nanoparticles may be prepared by a process in which a suspension of the organic macromolecule, typically in an aqueous medium, is combined with a source of ions of the appropriate metal or metals which is to comprise or consist the nanoparticle. Alternatively, but presently less preferred, the source of metal ions may be present in suspension to which a source of organic macromolecule is added.

The mixture of organic macromolecules and metal ions may be agitated to ensure homogenization.

Where the nanoparticle is to comprise the elemental metal, a reduction is effected, preferably under an inert atmosphere, on the suspension whereby nanoscale metal particles form within the organic macromolecule cavity. Where the nanoparticle is a ferrite, an oxidation is effected whereby the ferrite nanoscale particles are formed within the organic macromolecule cavity. The reduction/oxidation step may be repeated between additions of metal ions (which may be the same or different in each cycle) to build up the nanoparticles.

The resultant suspension may be treated to remove particles not accommodated with a macromolecule, for example by a dialysis technique. The encased nanoparticles may then be isolated, for example by magnetic separation or centrifugation, prior to formation into the desired microwave absorbing structure as described above.

In some embodiments, the macromolecule casing may be removed to leave the nanoparticle without a coating. For example, where the coating is a protein, this may be denatured through, for example a pH change and the denatured protein material removed by, for example, dialysis or centrifugation.

In other embodiments, the casing may be carbonized to provide a carbon coating on the particles. This may most preferably be accomplished in suspension by laser pyrolysis. However, an alternative is to isolate the particles and then carbonize the protein shell, for example by heating in a furnace, prior to formation of the desired microwave absorbing structure as described above.

In a preferred embodiment of the present invention, the organic macromolecule is apoferritin. The following method may be utilized in this preferred embodiment.

The process begins with the removal of the ferrihydrite core from the native ferritin in aqueous solution, the incorporation of ferro- or ferri-magnetically ordered metal particles by, for example, sodium borohydride reduction of an aqueous metal salt solution into the ferritin cavities, which may be followed by the generation of a narrow size distribution through ultracentrifugation, and the dispersion of the particles in a non-conductive epoxy resin, from which the desired microwave absorbing structure may be formed.

A metal alloy core may be produced inside the apoferritin protein by sodium borohydride reduction of a selection of water soluble metal salts. Other reduction methods include carbon, carbon monoxide, hydrogen, hydrazine hydrate, or electrochemical. Similar reactions may be used for the production of rare earth/transition metal alloys. Alternatively, a suitable solution may be oxidised to yield an M-type or spinel ferrite core. Oxidation may be chemical or electrochemical to yield the metal ferrite.

In more detail, the protein ferritin is used to enclose a ferro- or ferri-magnetic particle whose largest dimension is limited by the 8 nm inner diameter of ferritin (although as stated above, this is capable of flexing to accommodate particles up to about 15 nm in diameter). The particles are produced first by removing the ferrihydrite core to yield apoferritin. The may be done by dialysis against a buffered sodium acetate solution under a nitrogen flow. Reductive chelation using, for example, thioglycolic acid may be used to remove the ferrihydrite core. This may be followed by repeated dialysis against a sodium chloride solution to completely remove the reduced ferrihydrite core from solution.

Once the apoferritin is produced, magnetic particles are incorporated in the following ways. The first is by reducing a metal salt solution in the presence of apoferritin. This is performed in an inert atmosphere to protect the metal particles from oxidation which would lessen their magnetic properties. A combination of metal salts in solution can also be reduced to generate alloys, or precursor materials. Another method is to oxidise a combination of an iron(II) salt and another metal salt. This gives a metal ferrite particle which does not suffer negatively from oxidation. The metal salts which are beneficial include salts of aluminium, barium, bismuth, cerium, chromium, cobalt, copper, dysprosium, erbium, europium, gadolinium, holmium, iron, lanthanum, lutetium, manganese, molybdenum, neodymium, nickel, niobium, palladium, platinum, praseodymium, promethium, samarium, strontium, terbium, thulium, titanium, vanadium, ytterbium, and yttrium.

While the production procedure detailed uses native horse spleen ferritin, this invention should not be seen as limited to that source. Ferritin can be found in vertebrates, invertebrates, plants, fungi, yeasts, bacteria, or even produced through recombinant techniques.

In this invention, one of the advantages of ferritin being employed to fabricate a magnetic particle through encapsulation, is that it can be used to select particles of a uniform size. This narrow size distribution enhances the monodispersity of the can allow the microwave absorbent material to be tuned to a specific frequency band if desired.

When producing nanoscale particles for use in microwave absorbing materials, one concern is the temperature characteristics of the magnetic particles. Microwave absorbing materials can be subjected to high temperatures such as 400–600° C. near the exhaust of a jet engine. At such temperatures, nanoscale particles can become superparamagnetic. Superparamagnetic particles are those which have permanent magnetic dipole moments, but the orientations of the moments with respect to the crystallographic axes fluctuate with time. This can cause a decrease in the cancellation or attenuation performance of the material. By selecting the materials incorporated into ferritin and the non-conductive matrix, such temperature and absorption characteristics can be addressed.

Some specific applications in which the microwave absorbing structure may be used are as follows.

Cellular phones. A coating may be provided on the front of the phone which attenuates radiation which would normally impinge on the head.

Radio-frequency (RF) noisy electronics. As microprocessors get faster, they generate harmonics which are in the microwave range. This noise may interfere with communications or vice-versa, and an attenuative case comprising a microwave absorbing layer in accordance with the invention may be valuable for computers or processor casings.

Microwave antennae Reference is made to U.S. Pat. No. 3,951,904. The microwave absorber of the present invention may be used for controlling the radiation pattern in a microwave antenna.

The invention will ow be illustrated by reference to the accompanying, non-limiting examples.

EXAMPLE 1

This example illustrates the preparation of apoferritin from horse spleen ferritin. Apoferritin was prepared from cadmium-free native horse spleen ferritin by dialysis (molecular weight cut-off of 10–14 kD) against sodium acetate solution (0.2 M) buffered at pH 5.5 under a nitrogen flow with reductive chelation using thioglycolic acid (0.3 M) to remove the ferrihydrite core. This was followed by repeated dialysis against sodium chloride solution (0.15 M) to completely remove the reduced ferrihydrite core from solution.

EXAMPLE 2

This example illustrates the preparation of iron metal within apoferritin. The apoprotein was added to a deaerated AMPSO/sodium chloride solution (0.1/0.4 M) buffered at pH 8.5 to give an approximate 1 mg/ml working solution of the protein which was heated to 60° C. A deaerated iron(II) [for example, as the acetate salt] solution (1 mg/ml) was added incrementally such that the total number of atoms added was approximately 500 atoms/apoprotein molecule. This was allowed to stir at room temperature for one day in an inert atmosphere. This was followed by reduction of the iron(II) salt with sodium borohydride to iron(0) metal. The final product yielded a solution of iron particles, each surrounded by a ferritin shell.

EXAMPLE 3

This example illustrates the preparation of cobalt metal within apoferritin. The apoprotein was added to a deaerated AMPSO solution (0.05 M) buffered at pH 8.5 to give an approximate 1 mg/ml working solution of the protein which was heated to 45° C. A deaerated cobalt(II) [for example, as the acetate salt] solution (0.1 M) was added incrementally such that the total number of atoms added was approximately 500 atoms/apoprotein molecule. This was allowed to stir at this temperature for one hour in an inert atmosphere. This was followed by reduction of the cobalt(II) salt with sodium borohydride to cobalt(0) metal. The final product yielded a solution of cobalt particles, each surrounded by a ferritin shell.

EXAMPLE 4

This example illustrates the preparation of a metal alloy such as yttrium cobalt ($YCo_5$) within apoferritin. The metal alloy followed the same procedure as Example 2, but using a 1:5 ratio of yttrium(III) [for example, as the acetate salt] to cobalt(II) [for example, as the acetate salt]. The final product yielded a solution of yttrium cobalt particles, each surrounded by a ferritin shell.

EXAMPLE 5

This example illustrates the preparation of a metal alloy such as cobalt platinum (CoPt) within apoferritin. The metal alloy followed the same procedure as Example 3, but using a 1:1 ratio of platinum(II) [for example, as the acetate salt] to cobalt(II) [for example, as the acetate salt] and a higher pH (9.0). The final product yielded a solution of cobalt platinum particles, each surrounded by a ferritin shell.

EXAMPLE 6

This example illustrates the preparation of a metal ferrite such as cobalt ferrite ($CoO.Fe_2O_3$) within apoferritin. The apoprotein was added to a deaerated AMPSO/sodium chloride solution (0.1/0.4 M) buffered at pH 8.5 to give an approximate 1 mg/ml working solution of the protein which was heated to 60° C. A deaerated solution of cobalt(II) [for example, as the acetate salt] and iron(II) [for example, as the ammonium sulphate salt] in a ratio of 1:2 was added incrementally and selectively oxidised using trimethylamine. The final product yielded a solution of cobalt ferrite particles, each surrounded by a ferritin shell.

EXAMPLE 7

This example illustrates the incorporation of the product of Examples 2–6 into a non-conductive matrix. The product of Examples 2–4 was freeze dried, milled, then mixed and dispersed in a volume ratio of 1/1 with a two component epoxy resin and applied to a surface. The final product yielded a microwave absorbing medium.

What is claimed is:

1. A microwave absorbing structure, comprising a non-conductive matrix within which are embedded a plurality of spatially-separated magnetic particles, each of said magnetic particles having a largest dimension no greater than 100 nm, said plurality of magnetic particles prepared by a process comprising the step of forming at least one of said magnetic particles within a shell of at least one organic macromolecule.

2. The microwave absorbing structure of claim 1, wherein each of said magnetic particles has a largest dimension no greater than 50 nm.

3. The microwave absorbing structure of claim 1, wherein each of said magnetic particles has a largest dimension no greater than 15 nm.

4. The microwave absorbing structure of claim 1, wherein said magnetic particles do not vary in their largest dimension by more than about 10%.

5. The microwave absorbing structure of claim 1, wherein said magnetic particles do not vary in their largest dimension by more than about 5%.

6. The microwave absorbing structure of claim 1, wherein at least one of said magnetic particles is accommodated within the organic macromolecule within which it is formed.

7. The microwave absorbing structure of claim 1, wherein said shell of said at least one organic macromolecule has been removed thereby forming an uncoated nanoscale particle.

8. The microwave absorbing structure of claim 1, wherein said shell of said at least one organic macromolecule has been carbonized thereby providing a carbon layer surrounding a nanoscale particle core.

9. The microwave absorbing structure of claim 1, wherein said at least one organic macromolecule is a molecule, or assembly of molecules, having a molecular weight of up to 1500 kD.

10. The microwave absorbing structure of claim 1, wherein said at least one organic macromolecule is a protein having a cavity for accommodating a nanoscale particle therein.

11. The microwave absorbing structure of claim 10, wherein said protein is an apoferritin.

12. The microwave absorbing structure of claim 1, wherein at least one of said magnetic particles comprises a material selected from the group consisting of a metal, a metal alloy, an M-type ferrite, or a spinel ferrite.

13. The microwave absorbing structure of claim 1, wherein said magnetic particles are selected from the group consisting of ferromagnetic particles, ferrimagnetic particles, and a mixture thereof.

* * * * *